United States Patent [19]

Karu

[11] Patent Number: 5,130,147
[45] Date of Patent: Jul. 14, 1992

[54] CHOLESTEROL LOWERING COLLOIDAL FOOD PRODUCT CONTAINING MEAT AND OMEGA FATTY ACID AND PROCESS FOR PREPARING

[76] Inventor: Hannu Karu, Kansakoulukatu 5 A 3, SF-00100 Helsinki, Finland

[21] Appl. No.: 694,443

[22] Filed: May 1, 1991

[51] Int. Cl.$^5$ .............................................. A23L 1/314
[52] U.S. Cl. ....................................... 426/2; 426/641; 426/643
[58] Field of Search ............... 426/641, 643, 646, 652, 426/417, 2

[56] References Cited

U.S. PATENT DOCUMENTS

| | | | |
|---|---|---|---|
| 4,357,362 | 11/1982 | Barker | 426/643 |
| 4,764,392 | 8/1988 | Yasufuku et al. | 426/417 X |
| 4,867,986 | 9/1989 | Desai et al. | 426/417 X |
| 4,874,629 | 10/1989 | Chang et al. | 426/417 X |
| 4,963,370 | 10/1990 | Uchida et al. | 426/643 X |

OTHER PUBLICATIONS

Fomo et al., *Bailey's Industrial Oil and Fat Products*, vol. 1, 4th ed., 1980, Table 6.96.
Hawley's *Condensed Chemical Dictionary*, Van Nostrand and Reinhold, New York, (11th ed.) at p. 607 (1987).

*Primary Examiner*—Arthur L. Corbin
*Attorney, Agent, or Firm*—Merchant, Gould, Smith, Edell, Welter & Schmidt

[57] ABSTRACT

A method of making a food product from prime meat, said product being capable of lowering blood cholesterol levels, wherein the prime meat is made to react with omega-3, omega-6 and/or omega-9 group fatty acids by homogenizing their mixture into a colloid.

21 Claims, No Drawings

CHOLESTEROL LOWERING COLLOIDAL FOOD PRODUCT CONTAINING MEAT AND OMEGA FATTY ACID AND PROCESS FOR PREPARING

BACKGROUND OF THE INVENTION

The aim of the invention is to provide a method to manufacture a biotechnical product which lowers the cholesterol level in blood. A further aim of the invention is to provide a biotechnical product, which lowers the cholesterol level in blood.

A raised cholesterol level of blood is cardiovascular and internal diseases. The cholesterol content in blood is hazardously increased by foods containing cholesterol, particularly saturated fats and foods containing them, such as fatty beef, pork, pork fat, mutton fat, eggs, etc. Attempts have been made to solve the problem by increasing the use of foods with low cholesterol content i.e. with unsaturated fat content instead of foods with saturated fat content. The problem with saturated fatty acids and increasing the cholesterol content of blood has, however not been satisfactorily solved by this.

The purpose of the present invention is to remove the shortcomings mentioned above. A particular purpose of the invention is to present a method to manufacture a biotechnical product by which the properties in food products with saturated fat content, which increase the cholesterol content of blood, can be decreased. A special aim of the invention is to present a method by which a biotechnical product, which lowers the cholesterol content of blood can be manufactured from prime meat food so that the possible cholesterol contained by the meat will not cause an increase in the cholesterol content of blood, but will instead be eliminated from the system without causing an increase in the cholesterol content of blood. A further aim of the invention is to present a method to manufacture the product in question, which will also lower the cholesterol level in blood when consumed as food.

In addition the aim of the invention is to present a biotechnical product the use of which does not cause an increase in the cholesterol level in blood, but will lower the blood cholesterol level.

SUMMARY OF THE INVENTION

Herein, the prime meat means meat with protein content, obtained from animals (e.g. meat of a mammal, bird, reptile or fish or eggs), or fruit either containing or not containing protein, e.g. seeds, soybeans or so-called fruit pulp. The invention especially relates to meat from animals to be used in the manufacture of the biotechnical product or as its component, the corresponding product to be used as food as well as the corresponding method to lower the cholesterol level.

The invention is based on the fact revealed by studies that omega-3, omega-6 and/or omega-9 group fatty acids can be made to react with the cholesterol in prime meat by homogenization to form a rheologic mass. Homogenization is carried out by treating the mixture in question of fatty acids and prime meat by cutting, grinding or another way so that the mixture forms a colloid. Colloid in this patent report means a mass the particle size of which is 1–100 $m_\mu$ ($m_\mu$=millimicron; 1 mu=$10^{-9}$ cm). This colloid formed by prime meat particles and the fatty acids in question forms at the same time a rheologic mass, i.e. its ingredients are not separable. In a rheologic mass the cholesterol molecules and the fatty acids in question adhere to each other.

Fatty acids of the omega-3 group are unsaturated fatty acids, where the third carbon atom, starting from the $CH_3$ group is the first unsaturated carbon atom. These omega-3 group fatty acids are e.g. linolenic acid, eicosapentaenoic acid and docosahexaenoic acid.

Omega-6 group fatty acids are unsaturated fatty acids, where the sixth carbon atom, starting from the $CH_3$ group is unsaturated These omega-6 group fatty acids are e.g. linoleic acid and arachid acid.

Omega-9 group fatty acids are unsaturated fatty acids, where the ninth carbon atom starting from the $CH_3$ group is unsaturated. An omega-9 group fatty acid is e.g. the eicosatrienoic acid.

DESCRIPTION OF THE PREFERRED EMBODIMENTS

Of the omega-3, omega-6 and omega-9 group fatty acids the most beneficial for the invention are the omega-3 fatty acids, which are particularly effective in removing hazardous cholesterol. Also the omega-6 group fatty acids remove hazardous cholesterol, however, they have less tendency to link to cholesterol than the omega-3 group fatty acids. The omega-6 group fatty acids, e.g. arachid acid, form other beneficial compounds upon interaction with enzymes, e.g. prostaglandin. Also the omega-9 group fatty acids link to cholesterol and eliminate it, however, these fatty acids have less tendency to link to cholesterol than do the omega-3 or omega-6 group fatty acids.

A preferable raw material for the invention is fish meat, containing fish oil, which has a large amount of omega-3 group fatty acids, eicosapentaenoic acids, in particular. Especially the meat of salmon and salmonoid fish is preferable raw material of this type.

Homogenization of the mixture of raw materials into colloid can be performed by any known method per se, such as by cutting, grinding or in any other way, which is generally known in food industry. Homogenization is not further described in this connection.

The preferable amount of omega-3, omega-6 and/or omega-9 group fatty acids present in the homogenization, where the omega-6 and/or omega-3 group are the more preferable and the omega-3 group fatty acids the most preferable, is suitably 3–10%, preferably 4–6% of the total amount of the raw material, where the prime meat has been weighed and contains water in its normal condition, e.g. ordinary beef, cut fish or fruit pulp as is.

Homogenization is suitably performed in temperatures under 27° C., preferably in 17°–25° C. to prevent unwanted oxidation.

The homogenization time is preferably 5–8 min.

After homogenization, the pH of the foodstuff is preferably 5.6–6.5; allowable additives can be used to set the pH to a desired level, if needed.

The product, to be homogenized contains suitably 40–80%, preferably 50–70 p % prime meat.

The product to be homogenized can also contain other ingredients such as starch, e.g. 3–8 p %, preferably 4–6 p % and allowable additives, when wanted, e.g. 3–8, 4–6 p %.

The product to be homogenized may also contain added water e.g. 8–9 wt. %, preferably 10–20 wt. %. The water is preferably bacteriostatic water.

Prime meat and other raw materials to be used are preferably in essence free from added saturated fatty acids, cholesterol, sugar and/or lactose and its derivatives.

The biotechnical product to be manufactured in accordance with the invention can be a finished food item as such, e.g. pasta, sauce or other homogenic food. The biotechnical product can further be used as an intermediate product and/or as a precipitating component in food, e.g. meat pastas, fish pastas, processed meat products, processed fish products, meat patties, fish patties, meat sausages, fish sausages etc., i.e. generally in the manufacture of any processed foods as the main ingredient or as an additive. Any known manufacturing processes can be used in the manufacture such as mixing, cooking, etc. The biotechnical product in accordance with the invention can further be dried, e.g. into a powder, for storage and transportation and to be further mixed with the desired foodstuff or raw material for food.

The biotechnical product manufactured in accordance with the invention is further suited to be used, e.g. as the carrier agent, for medicines in connection with the dosage both for humans and animals. The biotechnical product can further be used in the manufacture of food and corr. fodder for domestic animals and for animals in general as an additive or main ingredient of food.

Cholesterol is a steroid similar to fat, which is contained in animal fat. Cholesterol forms an important part of nerve tissues and cell membranes. Sex glands and glands producing adrenalin use cholesterol in their hormone production. The liver further changes cholesterol into cholic acid to be used in digestion; the liver may at the same time release an excessive amount of cholesterol in the blood circulation, which has a detrimental effect by increasing the risk to developing cardiovascular and/or cardiac diseases. - The biotechnical product manufactured in accordance with the invention or its further processing contains as small an amount as possible of hazardous cholesterol and it is therefore healthy for the system. In addition to this, the cholesterol possibly present in the biotechnical product, when used as a food, is mainly compounded with the unsaturated fatty acids in question, particularly in the omega-3 fatty acids and is thus eliminated from the system in the natural way. In addition to this the biotechnical product of the invention, when used as a food, comes into contact with cholesterol, which has entered the digestive system along with other foods in connection with digestion, and tends to bind cholesterol into unsaturated, particularly the omega-3 group fatty acids, after which the cholesterol will be eliminated from the system in the natural way. In addition to these advantages, the biotechnical product manufactured in accordance with the invention, when used as a food, lowers the blood cholesterol level. Thus the biotechnical product manufactured in accordance with the invention, when used as a food, lowers blood cholesterol in many different ways.

The biotechnical product, manufactured in accordance with the invention, when used as a food, will probably also lower the body's triglycerides, which raise the blood cholesterol level and increase hazardous cholesterol in the body.

The method in accordance with the invention can be extensively applied in food industry to many lines of manufacture. Food products manufactured in accordance with the invention can further be used all over the world. The method in question is well suited for the manufacture of very different foods. The invention, when applied in practice provides everyone with the possibility to lower their own blood cholesterol content and to improve their health by lowering the blood cholesterol level.

The invention is described in detail in the following performance examples, which only are meant to illustrate the invention and the benefits obtained by it compared with known techniques without restricting the invention in any way.

EXAMPLE

Biotechnical products were manufactured in a study by using white-fish, pike, anchovy, tuna fish, sheep tongue and soybeans. Omega-3 fatty acids were added to prime meat, the mixture was changed into a rheologic mass by homogenizing it into colloid with a cutting treatment. The thus obtained compounds, energy values, protein contents, total fat contents, omega-3 group fatty acids, starch contents and amounts of water in the masses are presented in the enclosed table; weights/g.

TABLE 1

|  | % | Kcal/100 g | Prot. | Fat tot. | Omega-3 | C-hydr. | Water |
|---|---|---|---|---|---|---|---|
| White-fish | | | | | | | |
| Prime meat | 65 | 65.00 | 11.6 | 2.08 | * | * | 50.5 |
| Fish oil | 5 | 46.50 | * | 1.25 | 3.75 | * | * |
| Starch | 4 | 16.00 | * | * | * | 4 | * |
| Water | 20 | * | * | * | * | * | 20 |
| Other | 6 | 24.00 | 6 | * | * | * | * |
| Total | 100 | 151.50 | 17.6 | 3.33 | 3.75 | 4 | 70.5 |
| Pike | | | | | | | |
| Prime meat | 65 | 53.30 | 12 | 0.59 | * | * | 51.7 |
| Fish oil | 5 | 46.50 | * | 1.25 | 3.75 | * | * |
| Starch | 4 | 16.00 | * | * | * | 4 | * |
| Water | 20 | * | * | * | * | * | 20 |
| Other | 6 | 24.00 | 6 | * | * | * | * |
| Total | 100 | 139.80 | 18 | 1.84 | 3.75 | 4 | 71.7 |
| Anchovy | | | | | | | |
| Prime meat | 65 | 80.60 | 12.6 | 3.48 | * | * | 48 |
| Fish oil | 5 | 46.50 | * | 1.25 | 3.75 | * | * |
| Starch | 4 | 16.00 | * | * | * | 4 | * |
| Water | 20 | * | * | * | * | * | 20 |
| Other | 6 | 24.00 | 6 | * | * | * | * |
| Total | 100 | 167.10 | 18.6 | 4.63 | 3.75 | 4 | 68 |
| Tuna fish in water | | | | | | | |

TABLE 1-continued

|  | % | Kcal/100 g | Prot. | Fat tot. | Omega-3 | C-hydr. | Water |
|---|---|---|---|---|---|---|---|
| Prime meat | 65 | 183.95 | 12.9 | 0.59 | * | * | 50.7 |
| Fish oil | 5 | 46.50 | * | 1.25 | 3.75 | * | * |
| Starch | 4 | 16.00 | * | * | * | 4 | * |
| Water | 20 | * | * | * | * | * | 20 |
| Other | 6 | 24.00 | 6 | * | * | * | * |
| Total | 100 | 270.45 | 18.9 | 1.84 | 3.75 | 4 | 70.5 |
| Mutton | | | | | | | |
| Prime meat | 65 | 226.20 | 9.685 | 20.1 | 0.46 | 0 | 33.80 |
| Fish oil | 5 | 44.95 | 0 | 1.25 | 3.75 | 0 | 0.00 |
| Starch | 4 | 16.00 | 0 | 0 | 0 | 4 | 0.00 |
| Water | 20 | 0.00 | 0 | 0 | 0 | 0 | 20 |
| Other | 6 | 24.00 | 6 | 0 | 0 | 0 | 0.00 |
| Total | 100 | 311.15 | 15.69 | 21.35 | 4.21 | 4.00 | 53.80 |

I claim:

1. A method of preparing a biotechnical product from prime meat, the biotechnical product being capable of lowering blood cholesterol, said method comprising:
   forming a colloidal food product capable of lowering blood cholesterol in an animal, the colloidal food product consisting essentially of a prime meat and an omega-9 fatty acid, by homogenizing the prime meat and the omega-9 fatty acid for an effective amount of time to form the colloidal food product.

2. A method according to claim 1, wherein the colloidal food product has a particle size of about 1-100 m$\mu$.

3. A method according to claim 2, wherein the colloidal food product the omega-9 fatty acid is present at a concentration of about 3-8% by weight.

4. A method according to claim 3, wherein in said step of forming, homogenization is performed at temperatures less than about 27° C.

5. A method according to claim 3, wherein in said step of forming, said effective amount of time is about 5 to 8 minutes.

6. A method according to claim 3, wherein the colloidal food product has a pH of about 5.6 to 6.5.

7. A method according to claim 3, wherein the colloidal food product, the prime meat is present at a concentration of 40-80% by weight.

8. A method according to claim 3, wherein said step of forming further includes homogenizing of about 3-8% by weight of starch.

9. A method according to claim 3, wherein said step of forming, further includes homogenizing of about 8-20% by weight of water.

10. A method according to claim 3, wherein in the colloidal food product, the prime meat is essentially free of added saturated fatty acids, cholesterol, sugar, lactose and lactose derivatives.

11. A method according to claim 1, wherein the prime meat is fish.

12. A method according to claim 1, wherein the prime meat is meat from animals selected from the group consisting of mammals, birds and reptiles.

13. A colloidal food product useful for lowering blood cholesterol consisting essentially of:
   a prime meat and at least one omega-9 fatty acid, the prime meat and the omega-9 fatty acid being homogenized together to form a colloidal food product capable of lowering blood cholesterol.

14. A colloidal food product according to claim 13, wherein said colloidal food product has a particle size of about 1-100 m$\mu$.

15. A colloidal food product according to claim 13, wherein in said colloidal food product the omega-9 fatty acid is present in a concentration of about 4-10% by weight.

16. A colloidal food product according to claim 13, wherein in homogenization is performed at temperatures less than about 29° C., the homogenization time is about 5-8 minutes and the pH of said colloidal food product is about 5.6 to 6.5.

17. A food product according to claim 13, wherein said colloidal food product further comprises about 3-8% by weight of starch.

18. A food product according to claim 17, wherein said colloidal food product has about 40-80% by weight of prime meat.

19. A food product according to claim 13, wherein in said colloidal food product the prime meat is fish.

20. A food product according to claim 13, wherein in said colloidal food product the prime meat is meat obtained from the group consisting of mammal, reptile or bird.

21. A method for lowering blood cholesterol comprising:
   administering to an animal a colloidal food product capable of lowering blood cholesterol, the colloidal food product being composed of a prime meat and at least one omega-9 fatty acid, and wherein the prime meat and the omega-9 fatty acid are homogenized together to form the colloidal food product.

* * * * *

UNITED STATES PATENT AND TRADEMARK OFFICE
CERTIFICATE OF CORRECTION

PATENT NO. :     5,130,147
DATED      :     July 14, 1992
INVENTOR(S) :    Hannu Karu It is certified that error appears in the above-identified patent and that said Letters Patent is hereby corrected as shown below:

Item [57]

Abstract, line 2 "of making" should read --to manufacture--.

Abstract, line 3 delete "said product being capable of" after the word "meat".

Abstract, line 4 "levels" should read --level--.

Abstract, line 4 "wherein" should read --where--.

Column 1, line 13 insert --known to increase arteroschlerosis and thus the number of-- after the word "is".

Col. 6, claim 16, line 2, "in" should read --the--

Signed and Sealed this

Fourteenth Day of September, 1993

*Attest:*

BRUCE LEHMAN

*Attesting Officer*          *Commissioner of Patents and Trademarks*